(12) United States Patent
Parks et al.

(10) Patent No.: US 7,831,008 B2
(45) Date of Patent: Nov. 9, 2010

(54) MICROWAVE-POWERED PELLET ACCELERATOR

(75) Inventors: Paul B. Parks, San Diego, CA (US);
Francis W. Perkins, Boulder, CO (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 12/119,213

(22) Filed: May 12, 2008

(65) Prior Publication Data
US 2009/0028282 A1  Jan. 29, 2009

Related U.S. Application Data

(63) Continuation-in-part of application No. 11/256,662, filed on Oct. 21, 2005, now abandoned.

(51) Int. Cl.
*G21B 1/15* (2006.01)
*H05H 1/22* (2006.01)
(52) U.S. Cl. .................. 376/127; 376/100; 376/151
(58) Field of Classification Search .......... 376/127, 376/101, 151; 89/1.11, 1.14; 102/201
See application file for complete search history.

(56) References Cited

U.S. PATENT DOCUMENTS

| | | | |
|---|---|---|---|
| 3,722,677 | A | 3/1973 | Lehnert |
| 4,431,901 | A | 2/1984 | Hull |
| 5,140,275 | A | 8/1992 | Schoerner et al. |
| 5,560,844 | A | 10/1996 | Boulos et al. |
| 5,611,947 | A | 3/1997 | Vavruska |
| 6,303,007 | B1 | 10/2001 | Ohkawa |
| 6,410,880 | B1 | 6/2002 | Putvinski et al. |
| 7,194,852 | B1 | 3/2007 | Krishnan |
| 2007/0092050 | A1 * | 4/2007 | Parks et al. .................. 376/100 |

FOREIGN PATENT DOCUMENTS

JP    10010256 A    1/1998

OTHER PUBLICATIONS

Olynyk et al., "Development of a compact toroid fuelling system for ITER", Nuclear Fusion, vol. 48, 0950001 (9 pp.) (2008), IOP Publishing and International Atomic Energy Agency.*

Computerized translation of Ito, Yasuyuki (JP-10010256) as listed in "Foreign Patent Documents" above, obrained from Patent Abstracts of Japan, http://www19.ipdl.inpit.go.jp.

(Continued)

*Primary Examiner*—Johannes P Mondt
(74) *Attorney, Agent, or Firm*—Nydegger & Associates

(57) ABSTRACT

A system for fueling a plasma includes a gyrotron for radiating microwave energy into a waveguide. Also included is a module having a deuterium-tritium (DT) fuel pellet, a diamond, quartz or sapphire window, and a pusher medium located between the pellet and window that is made of frozen deuterium ($D_2$) and metallic particles. With the module in the waveguide, the gyrotron is activated. Radiation from the gyrotron is then directed into the waveguide and through the window to cause the inducement of current in the metal particles, causing the particles to become hot. The absorbed microwave energy is then transferred to the pusher medium by conduction resulting in a gaseous expansion of the pusher medium. This ejects the pellet from the waveguide and into the plasma.

17 Claims, 3 Drawing Sheets

OTHER PUBLICATIONS

Milora, S.L., "Review of hydrogen pellet injection technology for plasma fueling applications", J. Vac, Sci. Technology. A 7 (3), pp. 925-937 (May/Jun. 1989).

Shimada et al., "Chapter 1: Overview and summary", Eds. of "Progress in the ITER Physics Basis", Nuclear Fusion 47 (2007),S1-S17, IOP Publishing and International Atomic Energy Agency, Vienna (Austria).

Mukhovatov et al., "Chapter 9: ITER contributions for Demo plasma development", Eds. of "Progress in the ITER Physics Basis", Nuclear Fusion 47 (2007), S404-S413, IOP Publishing and International Atomic Energy Agency, Vienna (Austria).

Parks, et al., "A gyrotron-powered pellett accelerator for tokamak refuelling." Nuclear Fusion 46(2006), pp. 770-780, IOP Publishing and International Atomic Energy Agency, Vienna (Austria).

* cited by examiner

MICROWAVE-POWERED PELLET ACCELERATOR

This application is a continuation-in-part of application Ser. No. 11/256,662, filed Oct. 21, 2005, now abandoned. The contents of application Ser. No. 11/256,662 are incorporated herein by reference.

FIELD OF THE INVENTION

The present invention pertains generally to systems and methods for accelerating a projectile from standstill to a very high velocity (e.g. 3-5 km/sec). More particularly, the present invention pertains to systems and methods for injecting fuel pellets into a plasma in a plasma confinement device while controlling the core plasma density in the plasma confinement device. The present invention is particularly, but not exclusively, useful for systems and methods that use microwave energy to achieve high velocity fuel pellet injection into the plasma.

BACKGROUND OF THE INVENTION

Several applications can be envisioned wherein a projectile needs to be quickly accelerated from standstill to a very high velocity (e.g. 3-5 km/sec). For such applications, there are, obviously, certain constraints that require special consideration. For instance, when the acceleration path of the particle is curved, as opposed to being straight, centrifugal acceleration forces are created on the projectile. These forces then present additional constraints for consideration. In particular, any limitations the centrifugal acceleration forces may impose on the acceleration of the projectile must be evaluated. Even when a straight acceleration path is available, access to the path may become a significant concern. Add to this other considerations, such as a need to accelerate a series of projectiles at a high repetition rate, and a need to achieve reliable acceleration, and it becomes clear that each application requires special consideration.

As implied above, for specific instances wherein a projectile must be moved along a path that necessarily includes curves, the tortuous nature of the path can severely limit velocity of the projectile. Of particular concern regarding the acceleration of projectiles is the ability to fuel a plasma using projectiles (i.e. fuel pellets). It happens, however, that for several reasons, the use of fuel pellets for this purpose may be very desirable. Indeed, it is a standard practice to fuel various types of plasma confinement devices by injecting frozen hydrogenic pellets into the plasma chamber.

It is also well known that toroidally shaped plasma confinement devices are more efficiently fueled, if the fuel can be delivered into the plasma from its (high field side) inner wall. To do this, however, fuel pellets typically need to travel from outside the plasma confinement device and into the plasma. This may require the pellet to travel along a path that is quite tortuous. Nevertheless, in order to ensure good plasma penetration by the fuel pellets, and to have density control flexibility, it is still necessary that the fuel pellet be injected into the plasma at very high velocities. Heretofore, the practice has been to rely on whatever velocity can be practicably attained when acceleration of the pellet is accomplished before the pellet enters the plasma confinement device.

In light of the above, it is an object of the present invention to provide systems and methods for accelerating projectiles (fuel pellets), wherein the pellet is moved at a relatively low velocity until the pellet is in position for rapid acceleration and injection into the plasma chamber of the plasma confinement device. Another object of the present invention is to provide systems and methods for accelerating projectiles (fuel pellets) wherein a propulsion force on the pellet is initiated using microwave energy. Still another object of the present invention is to provide systems and methods for accelerating projectiles (fuel pellets) that are easy to use, are relatively simple to operate, and are comparatively cost effective.

SUMMARY OF THE INVENTION

A system for providing fuel to a plasma has a waveguide, and a gyrotron for directing microwave energy into the waveguide. Also, the system includes a module that is pre-positioned in the waveguide to interact with microwave energy from the gyrotron. The result of this is that a fuel pellet in the module is ejected from the waveguide and into the plasma chamber to fuel plasma in a plasma confinement device More particularly, the claimed invention is currently applicable to fueling of certain magnetic confinement devices in basic thermonuclear energy research, such as tokamak devices.

In accordance with the present invention, the waveguide has a substantially straight section that extends between a first end and a second end. This straight section also has a predetermined, substantially uniform cross-sectional area along its length. In combination with the waveguide, the gyrotron mentioned above is used to radiate microwave energy into the straight section. Specifically, the radiation from the gyrotron is directed by the waveguide from the first end of the straight section toward its second end. Accordingly, the second end of the waveguide's straight section is connected in communication with the plasma chamber of the plasma confinement device.

The module that is used for the present invention is integrated in the sense it has several distinct components. In particular, the integrated module includes a fuel pellet that will be used for fueling the plasma in the chamber. Along with the fuel pellet, the integrated module also includes a window and a pusher medium that is positioned between the pellet and the window. Additionally, the module can include a metallic reflector (e.g. a Lithium foil). If used, the metallic reflector is positioned between the fuel pellet and the pusher medium. Importantly, the assembled integrated module, with all of its constituent components, is dimensioned for insertion into the straight section of the waveguide. Stated differently, all components substantially conform to the interior dimensions of the waveguide.

In greater detail, the fuel pellet of the module is made of frozen deuterium-tritium (DT) or simply pure deuterium ($D_2$). The window is made from a high strength material with good microwave transparency qualities (e.g. diamond, quartz or sapphire). And, the pusher medium comprises a mixture of a suitable volatile substance, preferably frozen deuterium ($D_2$) and metallic particles. More specifically, the metallic particles in the pusher medium are preferably spherical or disc-shaped conductors that are made from a low atomic number material (e.g. lithium (Li), beryllium (Be), or carbon (C)). For optimal absorption of microwave power transmitted through the pusher medium, the metallic particles, if spherical, have a mean radius "a" between one to ten microns (1 μm<a<10 μm). Furthermore, it is preferable that there be a separation distance "s" between the metallic particles of approximately s~7a, i.e., (7 μm<s<70 μm). With this range of particle sizes and separation distances, the concentration of metallic particles in the pusher medium will be limited to about one percent or less of the volume of the pusher medium.

In the operation of the system of the present invention, a module is first positioned in the straight section of the waveguide. This can be done in either of two ways. For one, a complete module is pre-assembled outside the waveguide. It is then released into the waveguide so that the module enters the straight section of the waveguide through its first end. For the other, the window is permanently affixed to the waveguide, in the straight section, at its first end. Only the pusher medium, metallic reflector and fuel pellet are then pre-assembled, outside the waveguide. This combination is then released into the waveguide so that it enters the straight section of the waveguide through the second end for subsequent contact of the pusher medium with the window. In either case, a complete module is created and positioned inside the waveguide.

Once a module has been positioned, and is in place in the straight section of the waveguide, the gyrotron is activated. Radiation from the gyrotron is then directed by the waveguide through the window of the module to interact with the pusher medium. The microwaves interact with the metallic particles within the pusher medium inducing an alternating electrical current flow on the outer surface of the metal particles. The currents heat the metal particles to high temperatures, which in turn heats the pusher medium in contact with the particles. This heat transfer easily vaporizes the volatile pusher medium and creates a high pressure "propellant" gas which accelerates the pellet down the waveguide/guide tube and ejects it into the plasma chamber.

As intended for the present invention, the gyrotron will have a high power radiation output that is in a range between approximately one and two megawatts (1-2 MW). Further, the microwave energy in the radiation will preferably be selected to have a wavelength "$\lambda$" that will effectively interact with the metallic particles for absorption of the radiation in the pusher medium. In general, wavelengths greater than about one millimeter ($\lambda$>1 mm) suffice for this purpose. The import here is to vaporize and continually heat the pusher medium, thereby keeping the expanding gases under high pressure during the acceleration of the pellet. All of this happens in a so-called "one shot" operation. Consequently, as the pusher medium expands, the fuel pellet will be ejected from the waveguide and into the plasma chamber. As envisioned for the present invention, the ejection of fuel pellets can be accomplished at a velocity above three kilometers per second.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
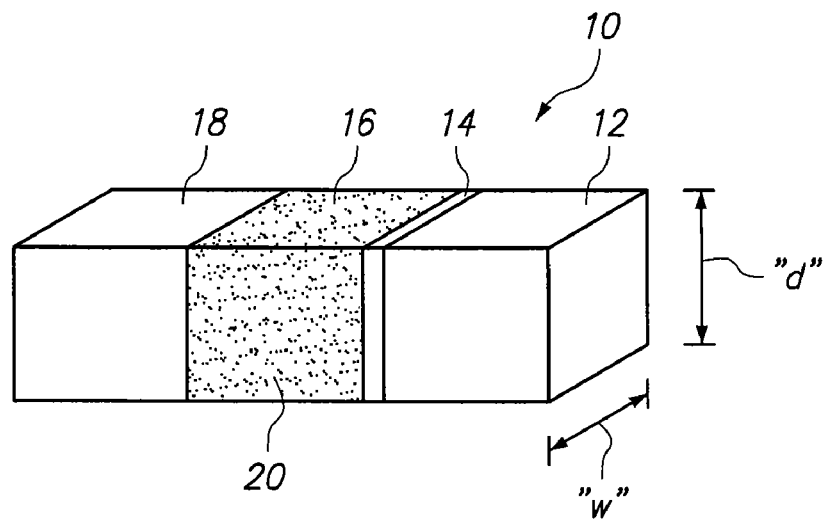
FIG. 1 is a perspective view of a module in accordance with the present invention.

Referring initially to FIG. 1 a module for use with the systems and methods of the present invention is shown and is generally designated 10. More specifically, FIG. 1 shows that the module 10 is integrated to include, in combination, a fuel pellet 12, a reflector 14, a pusher medium 16 and a window 18. For operational reasons, the order in which components of the module 10 are assembled for the present invention is important, and is not arbitrary. Specifically, the reflector 14, if used, is positioned between the fuel pellet 12 and the pusher medium 16, as shown. Note: the reflector 14 may be omitted if desired. If so, then the fuel pellet 12 is juxtaposed with the pusher medium 16. In either case, with or without the reflector 14, the window 18 is juxtaposed with the pusher medium 16, and is positioned in the module 10 opposite the fuel pellet 12.

In addition to the order in which components of the module 10 are assembled, the materials used for the various components of the module 10 are important. For example, the fuel pellet 12 for module 10 is preferably, but not limited to, frozen deuterium-tritium (DT). Depending on the particular application, however, the fuel pellet 12 can be made of any composition of matter that can be accelerated as a projectile. When used, the reflector 14 is preferably made of a very thin Lithium foil and, as a practical matter, needs only be several microns thick. Again, other reflective materials may be used. The import here is that a reflector 14 be useful for reflecting radiation (e.g. microwave power) back into the pusher medium 16 for enhanced absorption. To interact with the radiation, the pusher medium 16 is preferably a mixture of frozen deuterium ($D_2$) and metal particles 20. And, the window 18 needs to be made of a material that is transparent to radiation (microwave power), such as diamond, quartz or sapphire.

With the above in mind, the composition of the pusher medium 16 is of particular interest. In the pusher medium 16 the metal particles 20 can be made of any suitable conductor, such as Lithium (Li), Beryllium (Be) or Carbon (C). Further, the metal particles 20 can be shaped as spheres or discs. Preferably, however, the metal particles 20 are shaped as discs that have a radius "a" of about four microns. Importantly, the metal particles 20 are dispersed through the frozen deuterium ($D_2$) with inter-particle spacing "s" between particles 20 that is less than approximately five microns. Also, they are dispersed in a concentration that is about one percent of the volume of the pusher medium 16. Of particular importance here is that the "effective" or global macroscopic conductivity of the pusher medium 16 is optimized. This is done by keeping the size of the particles 20, and the inter-particle spacing between particles 20, well below the mm-sized wavelength "$\lambda$" of the microwave power that will be used to heat the pusher medium 16.

In combination, the components of the module 10 can be joined together in any manner well known in the pertinent art. As shown in FIG. 1, the module 10 is assembled as a rectangular solid having a height "d" and a width "w". For most applications, the dimensions "d" and "w" will be in a range of about 2-20 millimeters. These dimensions, of course, can be varied according to the requirements of the particular application and, in some, the width may be equal to the height (e.g. d=w). The overall length of the module 10 will also depend on requirements of the particular application. For instance, requirements such as how much fuel is required for the fuel pellet 12, and how much propellant is needed for the pusher medium 16 may cause the dimensions of the module 10 to be varied. In each case, however, it is always important that the cross sectional area of the module 10 (e.g. w×d) conform to, and be compatible with, the cross sectional area of the waveguide that will be used for activation of the module 10.

Figure 2:
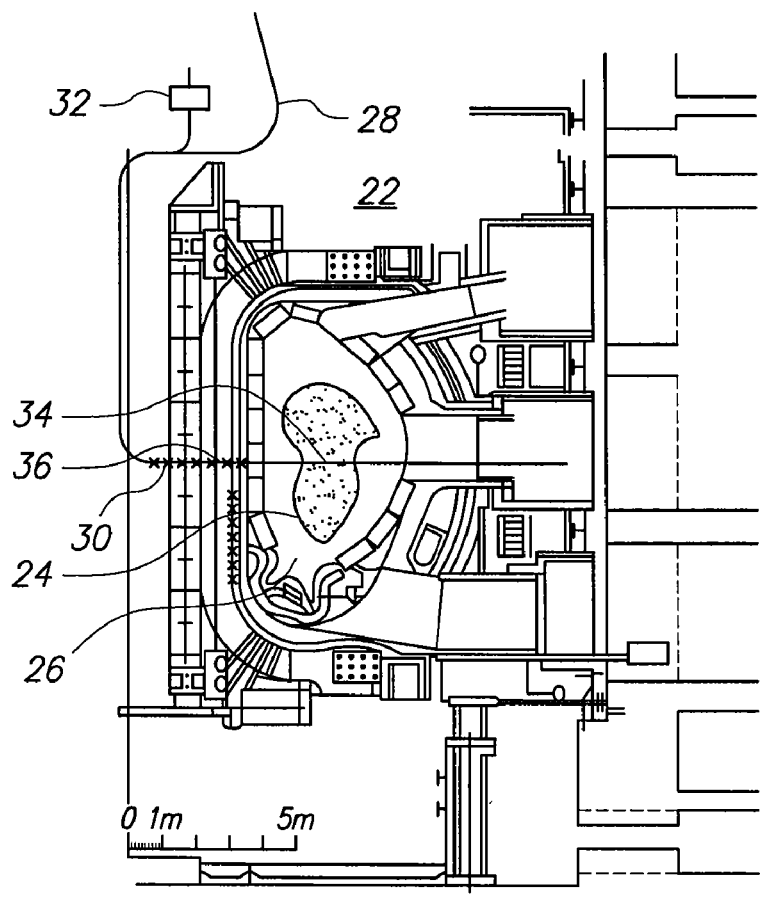
FIG. 2 is a cross section view of a type of plasma confinement device showing an incorporation of a system of the present invention.

Turning now to FIG. 2, a particular environment in which the module 10 (cross reference FIG. 1) of the present invention may be used is shown to be a plasma confinement system, generally designated 22. It is to be appreciated, however, that the plasma confinement system 22 as shown, is only exemplary. The import of the present invention is for a system and method that employs a microwave-powered pellet accelerator useable for fueling a plasma in a variety of different environments. With this in mind, for purposes of discussion, the plasma confinement system 22 is shown to contain a plasma 24 that is confined within a chamber 26. As intended for the present invention, and mentioned above, the purpose here is to fuel the plasma 24. To do this, the module 10 is pre-positioned in the plasma confinement system 22, and it is then activated to inject the fuel pellet 12 (see FIG. 1) into the plasma 24. For example, in an embodiment of the present invention as shown in FIG. 2, a module 10 (see FIG. 1) is advanced through a waveguide 28 and is pre-positioned at a point 30 in the waveguide 28. Once the module 10 (see FIG. 1) is at the point 30, microwave power is radiated into the waveguide 28 from a gyrotron 32. This microwave power then activates the module 10 by heating the pusher medium 16 and causing it to rapidly expand as a gas. The intended consequence of this is that the fuel pellet 12 (see FIG. 1) is ejected at a very high velocity (e.g. 3 km/sec) from the waveguide 28, and injected into the plasma 24. Various embodiments for doing all of this are best seen with reference to FIGS. 3A, 3B, 4A, and 4B.

Figure 3A:
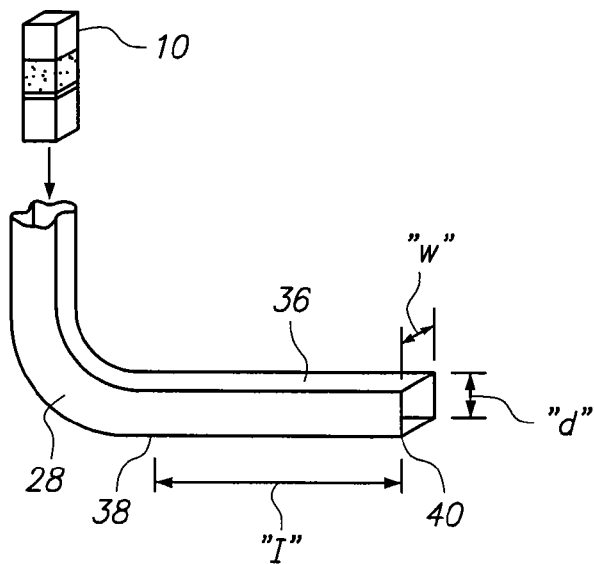
FIG. 3A is a perspective view of a waveguide as it receives a module for subsequent module activation.

Referring first to FIG. 3A, it will be seen that the waveguide 28 includes a straight section 36. Specifically, the straight section 36 is shown to have a length "l" that extends from a first end 38 to a second end 40. Also, the waveguide 28 is shown to have a cross sectional area that is defined by a height "d" and a width "w". With reference to the dimensions of module 10 discussed above, it is to be appreciated that there will necessarily be some tolerance between the respective "d" and "w" of the module 10 and "d" and "w" of the waveguide 28. Nevertheless, this tolerance can, and should, be minimized. Again, this can be done with operational considerations in mind. On this point, again for operational reasons, the particular shape of the cross section of guidewave 28 is essentially a matter of design choice (e.g. circular, rectangular, oval etc.).

Figure 4A:
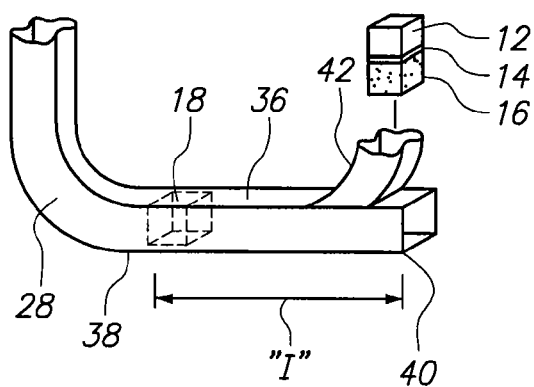
FIG. 4A is a perspective view of an alternate embodiment of a waveguide as it receives a module for subsequent module activation.

Referring now to FIG. 4A, in an alternate embodiment of the present invention, the waveguide 28 is shown to include a chute 42 that is located between the ends 38 and 40 of straight section 36. In all important respects, for both embodiments of the waveguide 28 (FIG. 3A and FIG. 4A) the respective straight sections 36 are functionally identical. Most important, the sections 36 are straight so there will be no structural limitations to the rapid linear acceleration of any fuel pellet 12 when it is ejected through the end 40 of waveguide 28 by the activation of a module 10.

Figure 3B:
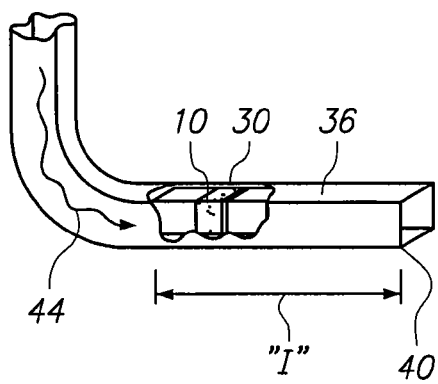
FIG. 3B is a view of the waveguide shown in FIG. 3A with the module positioned for activation.

In the operation of the present invention, there are essentially two ways by which a module 10 can be positioned in the straight section 36 of a waveguide 28 for activation. The first is illustrated in FIGS. 3A and 3B. There it is to be appreciated that a module 10 is pre-assembled outside the plasma confinement system 22 before it is placed in the waveguide 28. Once in the waveguide 28, the module 10 is allowed to travel through the waveguide 28, at a relatively low velocity (e.g. 50 m/sec), until it reaches the point 30 (see FIG. 2 and FIG. 3B). At the point 30, the module 10 is activated. Specifically, with the module 10 at point 30, the gyrotron 32 is energized to direct radiation 44 through the waveguide 28. The radiation 44 then interacts with the pusher medium 16 of the module 30, to heat the pusher medium 16 and thereby cause a gaseous expansion that will eject the fuel pellet 12 of module 10 from the waveguide 28. As indicated in FIG. 2, the ejection of a fuel pellet 12 will cause it to travel along the path 34, and into the plasma 24. There, the fuel pellet 12 is used to fuel the plasma 24.

Figure 4B:
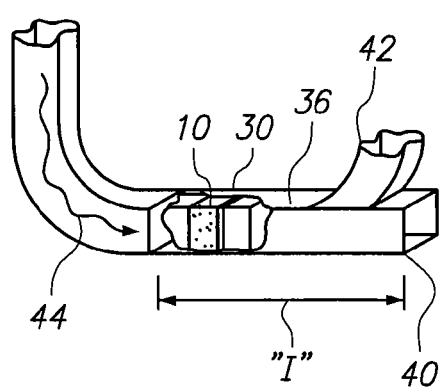
FIG. 4B is a view of the waveguide shown in FIG. 4A with the module positioned for activation.

The second way by which a module 10 can be positioned in the straight section 36 of a waveguide 28 is illustrated in FIGS. 4A and 4B. In this case, the straight section 36 is modified in at least two aspects. For one, the window 18 is permanently affixed in the section 36 at the point 30. For another, only the fuel pellet 12, reflector 14 (if used), and pusher medium 16 are pre-assembled outside the plasma confinement system 22. As shown in FIG. 4B, after the combination of fuel pellet 12, reflector 14 and pusher medium 16 has been inserted through the chute 42, a module 10 is effectively assembled at the point 30. As with the embodiment of the invention shown in FIGS. 3A and 3B, the module 10 is then activated.

Figure 5A:
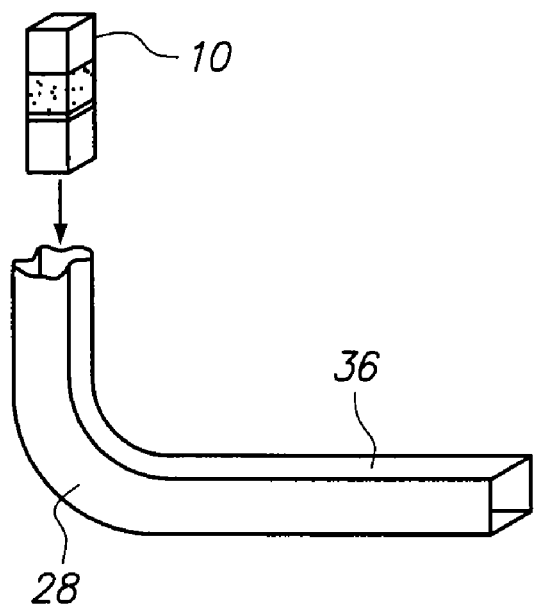
FIG. 5A is a perspective view of a waveguide receiving a module for activation.

To underscore the versatility of the present invention, FIG. 5A shows a module 10 being injected into the waveguide 28 of a device (not shown). More particularly, for purposes of the present invention the device may be of any type, well known in the art, which is usable for creating a plasma 24. Again, references to plasma confinement systems (i.e. plasma confinement system 22) are only for exemplary purposes.

Figure 5B:
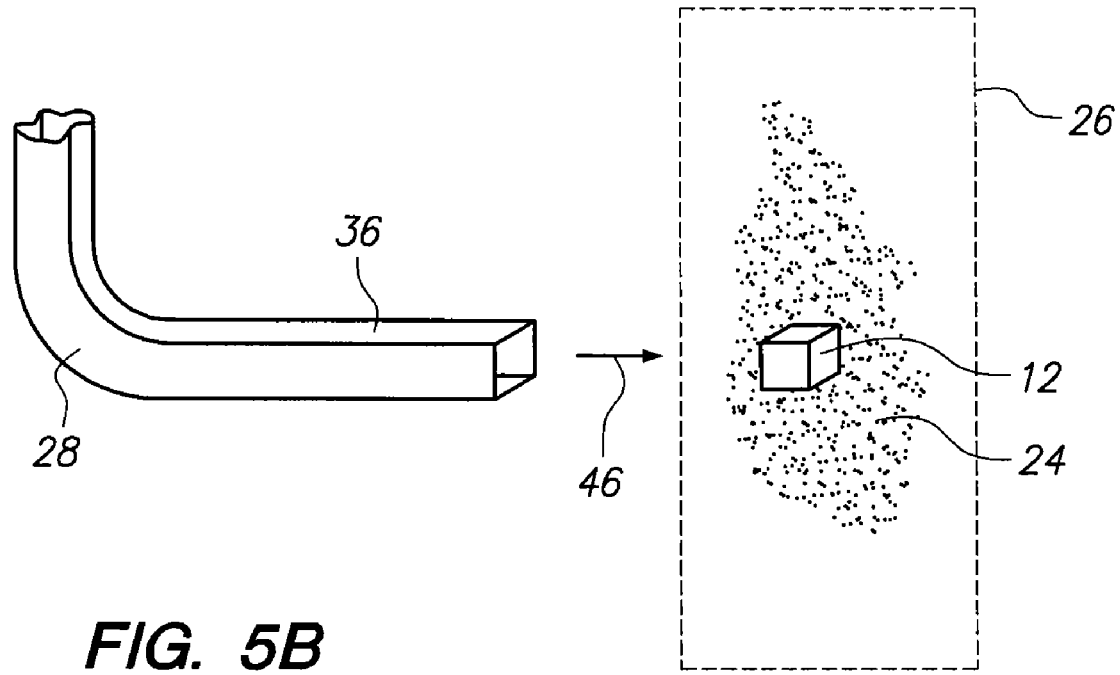
FIG. 5B is a perspective view of a fuel pellet being injected into a plasma after activation of a module in a waveguide.

As mentioned above, once the module 10 is in position in the waveguide 28, the gyrotron 32 is used to activate the module 10. The result of this activation is an acceleration of the fuel pellet 12 in the direction of arrow 46 (see FIG. 5B). Thus, the fuel pellet 12 is ejected from the waveguide 28 and into the plasma 24. Inside the chamber 26, the fuel pellet 12 functions to fuel the plasma 24. In all instances, activation of the module 10 with radiation 44, and the consequent acceleration of the fuel pellet 12 can be engineered as disclosed herein to achieve compliance with the requirements necessary for using fuel pellets 12 as fuel for the plasma 24.

While the particular Microwave-Powered Pellet Accelerator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An integrated module useable with a source of microwave energy for ejecting a pellet from a waveguide, wherein the waveguide has a predetermined cross-sectional area and the module comprises:

a pellet dimensioned so as to substantially conform with the cross-sectional area of the waveguide;

a window dimensioned so as to substantially conform with the cross-sectional area of the waveguide; and a solid pusher medium positioned in an integrated sequence between said pellet and said window, said solid pusher medium being configured to absorb radiation from the source of microwave energy when radiation is directed therefrom into the waveguide and through said window causing a gaseous expansion of the pusher medium so as to eject said pellet from the waveguide.

2. A module as recited in claim 1 further comprising a metallic reflector positioned between said pellet and said pusher medium.

3. A module as recited in claim 2 wherein said metallic reflector is a Lithium foil.

4. A module as recited in claim 1 wherein said window is fixedly positioned in the waveguide.

5. A module as recited in claim 1 wherein said pellet is made of deuterium-tritium (DT).

6. A module as recited in claim 1 wherein said window is made of a material with high strength and high microwave transparency selected from a group consisting of diamond, quartz and sapphire.

7. A module as recited in claim 1 wherein said pusher medium comprises frozen deuterium ($D_2$) and metallic particles.

8. A module as recited in claim 7 wherein the metallic particles are disc-shaped conductors made of material with low atomic mass selected from a group consisting of lithium (Li), beryllium (Be), and carbon (C), and having a radius of about four microns.

9. A module as recited in claim 8 wherein the microwave energy has a wavelength greater than one millimeter and said pusher medium contains metallic particles having a particle separation distance of approximately five microns.

10. A module as recited in claim 8 wherein the source of microwave energy is a gyrotron having a high power radiation output in a range between approximately one and two megawatts.

11. A module as recited in claim 1 wherein the waveguide has a rectangular cross sectional area and includes a substantially straight section having a first end and a second end.

12. A module as recited in claim 11 wherein the pellet is ejected from the waveguide through the second end thereof and into a plasma in a tokamak.

13. A system for providing fuel to a plasma which comprises:

a waveguide having a first end and a second end with a substantially straight section therebetween, said waveguide having a predetermined, substantially uniform cross-sectional area in said straight section;

a gyrotron for radiating microwave energy into the straight section of said waveguide through the first end thereof; and an integrated module positioned in the straight section of said waveguide, wherein said module comprises a pellet and a window, each dimensioned so as to substantially conform with the cross-sectional area of the waveguide, and a solid pusher medium positioned in an integrated sequence between said pellet and said window said solid pusher medium being configured to absorb radiation from the gyrotron when radiation is directed therefrom into the waveguide and through said window so as to cause a gaseous expansion of the pusher medium so as to eject the pellet from said waveguide and into the plasma.

14. A system as recited in claim 13 further comprising a metal lithium foil positioned between the pellet and the pusher medium.

15. A system as recited in claim 13 wherein the pellet is made of deuterium-tritium (DT), the window is made of a material with high strength and high microwave transparency selected from a group consisting of diamond, quartz and sapphire, and the pusher medium comprises frozen deuterium ($D_2$) and metallic particles.

16. A system as recited in claim 15 wherein the metallic particles are disc-shaped conductors made of lithium (Li), having a radius of about four microns with a separation distance between metallic particles of approximately five microns in said pusher medium.

17. A system as recited in claim 16 wherein said gyrotron has a high power radiation output in a range between approximately one and two megawatts, and wherein microwave energy in the radiation has a wavelength greater than one millimeter.

* * * * *